O. E. LINDFORS.
ENGINE STARTER.
APPLICATION FILED MAR. 23, 1918.
1,290,599.
Patented Jan. 7, 1919.
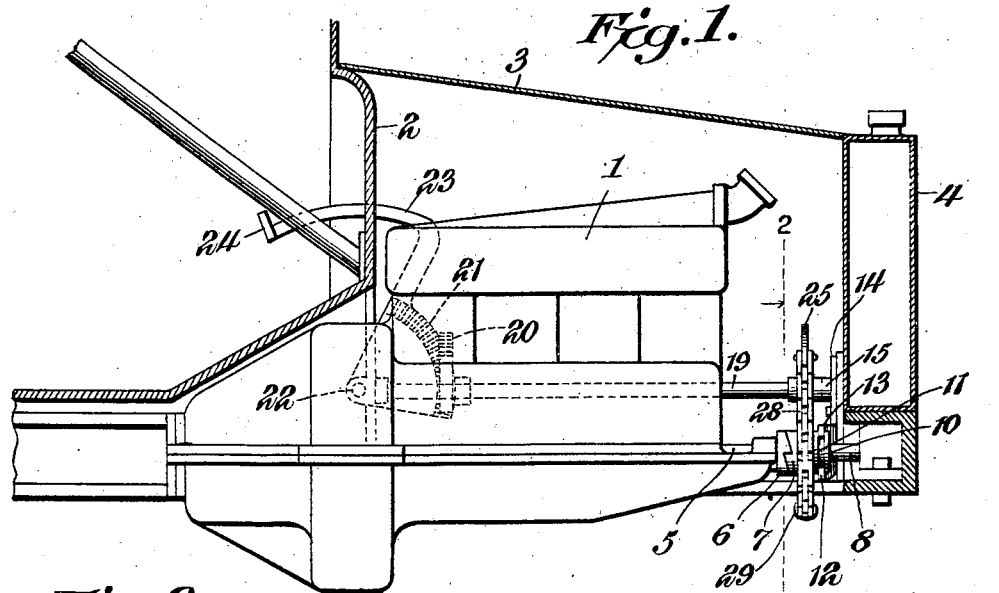
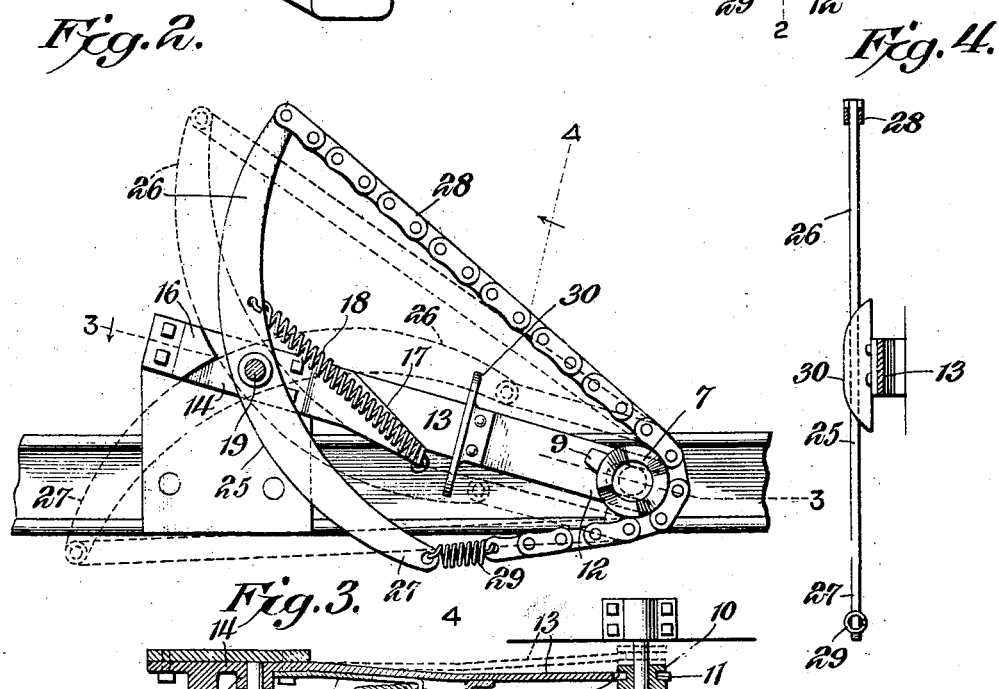
WITNESSES
Howard D. Orr.
F. T. Chapman.
INVENTOR,
O. E. Lindfors,
BY E. G. Siggers
ATTORNEY

UNITED STATES PATENT OFFICE.

OLAF EDWIN LINDFORS, OF FRUITA, COLORADO.

ENGINE-STARTER.

1,290,599. Specification of Letters Patent. Patented Jan. 7, 1919.

Application filed March 23, 1918. Serial No. 224,375.

*To all whom it may concern:*

Be it known that I, OLAF E. LINDFORS, a subject of the King of Sweden, residing at Fruita, in the county of Mesa and State of Colorado, have invented a new and useful Engine-Starter, of which the following is a specification.

This invention has reference to starters for motors, especially automobile motors of the explosive type, and its object is to provide a simple form of starter to be operated manually.

In accordance with the invention there is provided a rock arm extending on opposite sides of the axis of rocking and mounted on a rock shaft under the control of devices which may be manipulated by the operator of the vehicle. Connected to opposite ends of the rock arm is a flexible transmission member passed about a companion member mounted on a clutch head forming part of the clutch drive of the engine, the other part of the clutch forming a permanent part of the crank shaft of the engine.

The rock arm has a constant constraint toward one limit of its travel and is moved manually in the other direction in opposition to the constant constraint while the flexible transmission member is not only flexible but is longitudinally elastic. Moreover the clutch member under the control of the flexible transmission member also has a normal constraint to move one member of the clutch toward the other while the rock arm serves to disconnect the parts of the clutch when the rock arm is at either limit of its travel.

The construction is such that under normal running conditions the clutch is disconnected, but when it is desired to start the engine the operator has but to manipulate the starting mechanism, as by a foot pedal, whereupon the engine shaft is rotated a sufficient number of times to cause the engine to pick up its cycle of operations or, failing in this, a second or third impulse may be imparted to the pedal.

The invention will be best understood from a consideration of the following detailed description taken in connection with the accompanying drawing forming a part of this specification, with the understanding, however, that while the drawing shows a practical form of the invention, the latter is not limited to any strict conformity with the showing of the drawing, but may be changed and modified so long as such changes and modifications mark no material departure from the salient features of the invention as set forth in the appended claims.

Referring to the drawing:

Figure 1 is a side elevation of the starter as applied to an automobile engine, certain parts of the automobile being shown in section and the starter being in initial position.

Fig. 2 is a section on the line 2—2 of Fig. 1, omitting distant parts, and showing the structure on a larger scale than Fig. 1, with the starter approaching the end of its active stroke.

Fig. 3 is a section on the line 3—3 of Fig. 2.

Fig. 4 is a section on the line 4—4 of Fig. 2.

Referring to the drawing, there is shown an automobile engine 1, which showing may be taken as indicative of any suitable form of explosion engine. The adjacent parts of the automobile, such as the dash 2, hood 3, and radiator 4, are also indicated.

There is also shown a small portion of the engine shaft 5, on the outer end of which there is secured one member 6 of a cranking clutch such as is customarily used upon various types of automobiles. Alined with the engine shaft is another member 7 of the cranking clutch, which member 7, in so far as its cranking purpose is concerned, may correspond to the clutch member customarily provided in automobiles to be turned over by a suitable crank. The clutch member 7 is carried by one end of a spindle 8, and is provided with sprocket teeth 9 whereby the clutch member 7 serves both as an engaging member and as a sprocket pinion. Moreover the clutch member 7 is formed with an axial neck 10 having therein a groove 11 for receiving the forked end 12 of an elastic arm 13, which latter may be in the form of a flat steel spring having at the end remote from its forked end a head 14 provided with a boss 15 and an adjacent block 16 for a purpose to be described. Furthermore the arm 13 carries a finger 17 to which there is attached one end of a coiled spring 18.

Journaled in the boss 15 is one end of a rock shaft 19 continued through the hood 3 to a point about coincident with the dash 2 and there also journaled. Fast on the shaft 19 near the dash 2 is a segmental gear 20 meshing with another segmental gear 21 rockable about a pivotal axis 22. The gear 21 has fast to or formed thereon an arm 23 bent to extend through the dash 2 and terminating in a foot pedal 24 so located as to be within easy reach of the foot of the operator of the automobile.

Fast on the shaft 19 close to the boss 15 is a rock lever 25 having arms 26, 27 projecting oppositely from the shaft 19 and to practically equal extents. The two arms 26, 27 curve similarly from the shaft 19, but such curvature is not obligatory.

The spring 18 at the end remote from the finger 17 is connected to the arm 26 near the shaft 19 so that the spring has a normal tendency to rock the lever 25 in a certain direction, the spring yielding to movements of the lever arm 26 in the opposite direction.

The extremities of the two arms 26 and 27 are connected together by a sprocket chain 28 through a short coiled spring 29 extending from the extremity of the arm 27 to the corresponding end of the chain 28. The chain 28 travels about the sprocket pinion including the teeth 9 so that when the lever 25 is rocked the sprocket pinion will be rotated by travel of the chain 28.

In the path of the outer ends of the lever 25 is a cam 30 fast on the arm 13, and this cam has its opposite ends alike. When one arm of the lever 25, say the arm 26, engages the corresponding end of the cam 30 the arm 13 which carries the cam 30 is forced away from the path of the arm 26, the clutch member 7 participating in such movement. The same thing occurs when the arm 27 engages the corresponding end of the cam 30. At other times the normal elastic tendency of the arm 13 causes the clutch member 7 to move toward the clutch member 6.

When the parts of the starter are in their normal or inactive state they are in a position such as indicated in dotted lines in Fig. 2, where the lever 25 approaches the horizontal position, and in this case the arm 26 is in engagement with the cam 30 and the arm 13 has been forced in opposition to its normal tendency into dotted line position shown in Fig. 3, with the clutch member 3 drawn away from clutch member 6 and well out of its path.

When the operator desires to start the engine the usual control devices are properly adjusted, whereupon the operator pushes against the pedal 24, this resulting in turning the shaft 19 to carry the arm 26 from its low position to a high position, indicated in Fig. 2 in dotted lines, and the movement continues until the arm 26 engages the block 16 which serves as a stop. This movement of the arm 26 stretches the spring 18, thus putting it under additional tension. The described movement results in giving the engine two or more turns which are usually sufficient to start the engine and establish its cycle of operations. As soon as the pressure of the foot upon the pedal 24 is released, the spring 18 immediately becomes active to return the parts to the first position.

When the lever 25 is at either limit of its travel the clutch member 7 is unclutched from the clutch member 6 by engagement of one or the other of the arms 26 or 27 by the corresponding end of the cam 30, and especially when the engine is running and the starter has been returned to its first or normal position by the spring 18, the two clutch members are held apart by the action of the cam 30 upon the arm 26 so that there is no liability of injury to the parts by engagement of the cam member 7 with the running cam member 6.

The spring 29 serves to relieve both the operator and the parts operated from sudden jerks or jars whereby the operation of the structure is smoother than it would otherwise be.

In the event of back-firing the clutch is positively discontinued as soon as the arm 26 reaches the cam 30, and this movement represents but a relatively short movement of the pedal 24 so that the operator does not receive any material shock from such firing, especially as the knee is usually flexed, thereby, even in the event of considerable shock, serious injury is prevented.

What is claimed is:

1. A starter for explosive engines comprising clutch members, an elastic means engaging one clutch member and having a normal tendency to move it toward the other clutch member, rockable means connected to the first named clutch member for turning it, means on the elastic means in the path of the rockable member at the limits of travel of the rockable member for disconnecting the clutch members, and means connected to the rockable member for manipulating the latter.

2. A starter for explosive engines, comprising cranking clutch members with one movable toward and from the other axially, means engaging the axially movable clutch member and having a normal tendency to move it into clutching relation with the other clutch member, rock arms and connections therefrom to the axially movable clutch member for rotating it by rocking movements of the arms, and manipulating means for imparting rocking movements to the arms.

3. A starter for explosive engines, comprising cranking clutch members with one movable toward and from the other axially, means engaging the axially movable clutch member and having a normal tendency to move it into clutching relation with the other clutch members, rock arms and connections therefrom to the axially movable clutch member for rotating it by rocking movements of the arms, and manipulating means for imparting rocking movements to the arms, the rock arms and the mounting for the axially movable clutch member having co-acting parts for causing disengagement of the clutch members at the limits of movements of the rock arms and engagement of the clutch members in intermediate positions of the rock arms.

4. A starter for explosive engines, comprising an elastic arm, a cranking clutch member constrained by the arm for axial movements, a rock lever having arms on opposite sides of its axis, a flexible member connecting the ends of the arms and engaging the clutch member to rotate it, means for rocking the lever, and a cam member carried by the arm in the path of the lever for forcing the clutch member to inactive position at the limits of rocking movement of the lever.

5. A starter for explosive engines, comprising a rock lever having arms extending on opposite sides of its axis of rocking, a spring connected to the rock lever and constraining it in one direction, a sprocket chain connecting the ends of the lever, a cranking clutch provided with a member having sprocket teeth thereon engaged by the sprocket chain, elastic means engaging the clutch member constraining it toward clutching position, and a cam on the elastic means in the path of the lever for moving the clutch member against its normal constraint and toward the inactive position.

6. A starter for explosive engines, comprising a rock lever with arms on opposite sides of its axis of rocking, a spring constraining the lever in one direction, an elastic arm extending from the axis of rocking of the lever, a cam on the elastic arm in the path of the lever arms for forcing the elastic arm in opposition to its normal tendency by engagement with the cam of the lever arms, a starting clutch having one member axially movable and engaged by and normally constrained toward the other clutch member by the elastic arm, and a flexible member connecting the two lever arms and also engaging the axially movable clutch member to rotate the latter by rocking movements of the lever.

7. A starter for explosive engines, comprising a rock lever with arms on opposite sides of its axis of rocking, manipulating means for the rock lever, a spring connected to the lever for constraining it toward one limit of its rocking movement, an elastic arm in radial relation to the axis of rocking of the lever, associated starting clutch members with one member engaged by the elastic arm and constrained thereby toward the other clutch member, the first named clutch member being provided with sprocket teeth, a sprocket chain extending between the outer ends of the lever arms and engaging the sprocket teeth, and a cam on the elastic arm in the path of the lever arms.

8. A starter for explosive engines, comprising a rock lever with arms on opposite sides of its axis of rocking, manipulating means for the rock lever, a spring connected to the lever for constraining it toward one limit of its rocking movement, an elastic arm in radial relation to the axis of rocking of the lever, associated starting clutch members with one member engaged by the elastic arm and constrained thereby toward the other clutch member, the first named clutch member being provided with sprocket teeth, a sprocket chain extending between the outer ends of the lever arms and engaging the sprocket teeth, and a cam on the elastic arm in the path of the lever arms, the sprocket chain including a spring rendering the chain elastically expansible and contractible.

In testimony, that I claim the foregoing as my own, I have hereto affixed my signature in the presence of two witnesses.

OLAF EDWIN LINDFORS.

Witnesses:
F. P. FRASER,
M. A. WEST.